United States Patent
Rijckaert et al.

(10) Patent No.: US 6,718,117 B1
(45) Date of Patent: Apr. 6, 2004

(54) METHOD AND DEVICE FOR KEYFRAME-BASED VIDEO DISPLAYING USING A VIDEO CURSOR FRAME IN A MULTIKEYFRAME SCREEN

(75) Inventors: Albert M. A. Rijckaert, Eindhoven (NL); Adrianus J. M. Denissen, Eindhoven (NL); Jan P. L. Mourik, Eindhoven (NL); Erik P. M. Niessen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/214,372

(22) PCT Filed: Apr. 29, 1998

(86) PCT No.: PCT/IB98/00652
§ 371 (c)(1),
(2), (4) Date: Oct. 1, 2001

(87) PCT Pub. No.: WO98/50921
PCT Pub. Date: Nov. 12, 1998

(30) Foreign Application Priority Data

May 6, 1997 (EP) .............................................. 97201345

(51) Int. Cl.[7] .............................................. G06F 3/00
(52) U.S. Cl. .......................................... 386/46; 346/83
(58) Field of Search .................................. 386/1, 45, 46, 386/83; 345/721, 723; 360/27, 39, 43, 48, 72.1, 72.2, 69, 134; H04N 5/76, 5/92, 5/91, 9/79

(56) References Cited

U.S. PATENT DOCUMENTS

| 4,422,111 A | * | 12/1983 | Moeller et al. ............. 360/72.1 |
| 6,031,671 A | * | 2/2000 | Ayres ........................... 360/40 |
| 6,340,971 B1 | * | 1/2002 | Janse et al. .................. 345/721 |

OTHER PUBLICATIONS

Content–Based Video Indexing and Retrieval by S.W. Smoliar and H.J. Zhang, IEEE Multimedia, Summer 1994, pp. 62–72.

* cited by examiner

Primary Examiner—Thai Tran

(57) ABSTRACT

A video tape recorder is operated with multiple tracks that are physically in parallel to each other and are collectively accessible as a single logical track, through selectively displaying in parallel a plurality of video keyframes. Actual play is controlled through selectively accessing a particular displayed keyframe. In particular, various ones of the displayed keyframes are associated with a value-based display of an analog quantity to indicate an anticipated time lapse that will be necessary before actual play as pertaining to the associated keyframe may effectively start.

7 Claims, 3 Drawing Sheets

|  | 0% | 50% | | 100% |
|---|---|---|---|---|
| 0% | 20% | 40% | 60% | 80% |
| key frame 138 | 139 | 140 | 141 | 142 |
| 143 | 144 | 145 | 146 | 147 |
| 148 | 149 | 150 | 151 | 152 |
| 153 | 154 | 155 | 156 | 157 |
| view program | view segment | view from x to y | ... | ... |
FIG. 4
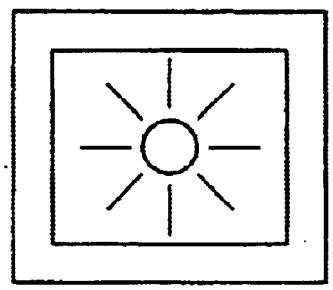
FIG. 5a
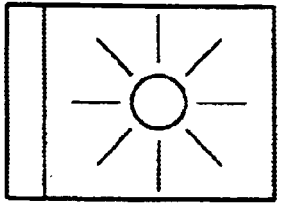
FIG. 5b
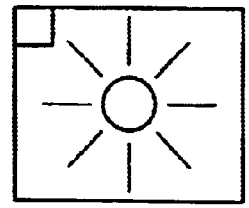
FIG. 5c
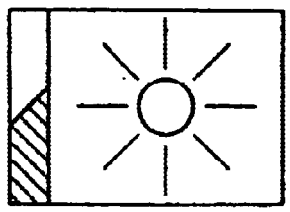
FIG. 5d
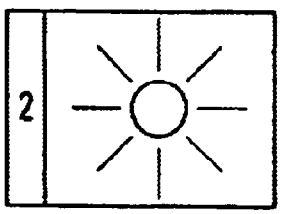
FIG. 5e

METHOD AND DEVICE FOR KEYFRAME-BASED VIDEO DISPLAYING USING A VIDEO CURSOR FRAME IN A MULTIKEYFRAME SCREEN

BACKGROUND OF THE INVENTION

1. Field of the Invention

The invention relates to a method for operating a video tape recorder which has multiple tracks that are physically in parallel to each other and are collectively accessible as a single logical track, through selectively displaying, in parallel, a plurality of video keyframes, for controlling actual play through selective accessing of a particular displayed keyframe.

2. Description of the Related Art

A method of this kind has been disclosed in U.S. Pat. No. 6,340,971, herein incorporated by reference.

The use of keyframes as representative parts of a video presentation that is recorded for subsequent selective playback has been proposed elsewhere. A video stream may include animation, a series of stills, or an interactive sequence of images. The character of the presentation may be various, such as, film, news, or, for example, a shopping list. State of the art is represented by the article "Content-Based Video Indexing and Retrieval" by S. W. Smoliar and H. J. Zhang, IEEE Multimedia, Summer 1994, pages 62–72. In similar manner as playing, the accessing may involve writing, editing, and the like. The parallel character of the physical tracks may be that they run side by side, essentially from the beginning of the tape essentially to its end. Alternatively, the parallelism may be caused in that the tracks run in an oblique manner across the tape, and, therefore, are staggered with respect to each other.

Keyframes may be derived from the video material upon its reception at a user's premises through some derivation algorithm, or keyframes may be labelled as such by the video provider, for example, in that each new video shot will start with a keyframe. A third assignment mechanism is to separate keyframes by a uniform time interval of play, or by a uniform distance on tape. The present invention recognizes that such keyframes should be utilized so as to give users a dynamic overview over the presentation, combined with useful facilities for enabling them to edit the material in a sensible manner.

Now, the serial stringing of the physical tracks to a single logical track has a complicating effect on the accessibility of the various key-frames, i.e., the time lapse necessary for actual accessing need no longer be proportional to the play time between an actual keyframe and an intended or target keyframe. This may be caused by the fact that each individual physical track may be accessed by quasi-instantaneous cross-track jumping, whereas motion along each physical track needs winding or rewinding the tape. A similar mechanism is present when various different presentations are accessible on the same physical tape in that they are, according to some strategy or another, stored in an interleaved manner. Replay then will need some kind of buffering mechanism that must be loaded to an appropriate degree before actual continuous replay may begin. Now, users may follow all kinds of zapping strategies, but will want to know the incurred delay up to the intended keyframe. This delay should be clear to an inexperienced consumer person, who would usually not be aware of the physical properties and storage format of the tape.

SUMMARY OF THE INVENTION

In consequence, among other things, it is an object of the present invention to visually indicate, to an inexperienced user, the actual delay until a particular keyframe may be accessed. As will be discussed hereinafter, the analog indication may be grasped by the user for multiple keyframes displayed side by side. Furthermore, the algorithm for generating the value of the analog indication is straightforward. Advantageously, said analog indication is displayed as framing the associated keyframe. Putting the indication slightly outside the keyframe picture leaves the information contained in the keyframe itself uninfluenced. Advantageously, the analog indication is a color. Colors, in particular, can be seen virtually at a glance. The invention also relates to a video tape recorder arranged for practising the recited method. In this manner, the user gets an apparatus that offers an extremely straightforward manner of accessing even very long video recordings.

The analog quantity may be a color, a grey-scale, a thermometer code, or any appropriate item of which the value is immediately apparent without recourse to decoding one or more digits, character, or the like. The value is generally a static one, because multiple quantities are displayed in parallel, each pertaining to a respective keyframe.

Advantageously, the method is used in association with a tape recorder enhanced with an effectively random access video buffer that is arranged for diminishing the time lapse, while adapting the analog quantity in accordance with the diminishing time lapse. Although, in various instances, the time lapse may be diminished to a substantial degree, the remaining value thereof may warrant its specific display to warn the user that an appreciable time lapse may still be forthcoming.

The invention also relates to a video tape recorder that is arranged for implementing the above method.

BRIEF DESCRIPTION OF THE DRAWINGS

These and other aspects and advantages of the invention will be discussed more in detail with reference to the disclosure of preferred embodiments hereinafter, and, in particular, with reference to the accompanying drawings, in which:

FIG. 4 is a design of a scrolling mosaic user interface; and

FIGS. 5a–5e show various format embodiments of a single keyframe.

DESCRIPTION OF THE PREFERRED EMBODIMENTS

Various advantageous aspects, in particular, but not exclusively pertaining to an ordinary customer and private home use, imply the following:

- The keyframes must be presented in such a manner that they are generally distinguishable from each other by a user located at a typical TV viewing distance, as related to the video size in question, this distance amounting to a few meters for a family set, while somewhat less for a desktop;
- The number of keyframes presented in parallel on a screen should be sufficient for providing a user with an overview of a significant part of the contents of the digital video material;
- The keyframes should be displayed in an undistorted fashion for maximizing discernability;
- Preferably, the remote control device of the TV set itself operates as the user control input device;

Feedback must be such that the information associated to the feedback is perceivable from a typical viewing distance of an ordinary television set; and Concepts in the user interface should reflect the linear model of the video presentation that is familiar to users.

Figure 1:
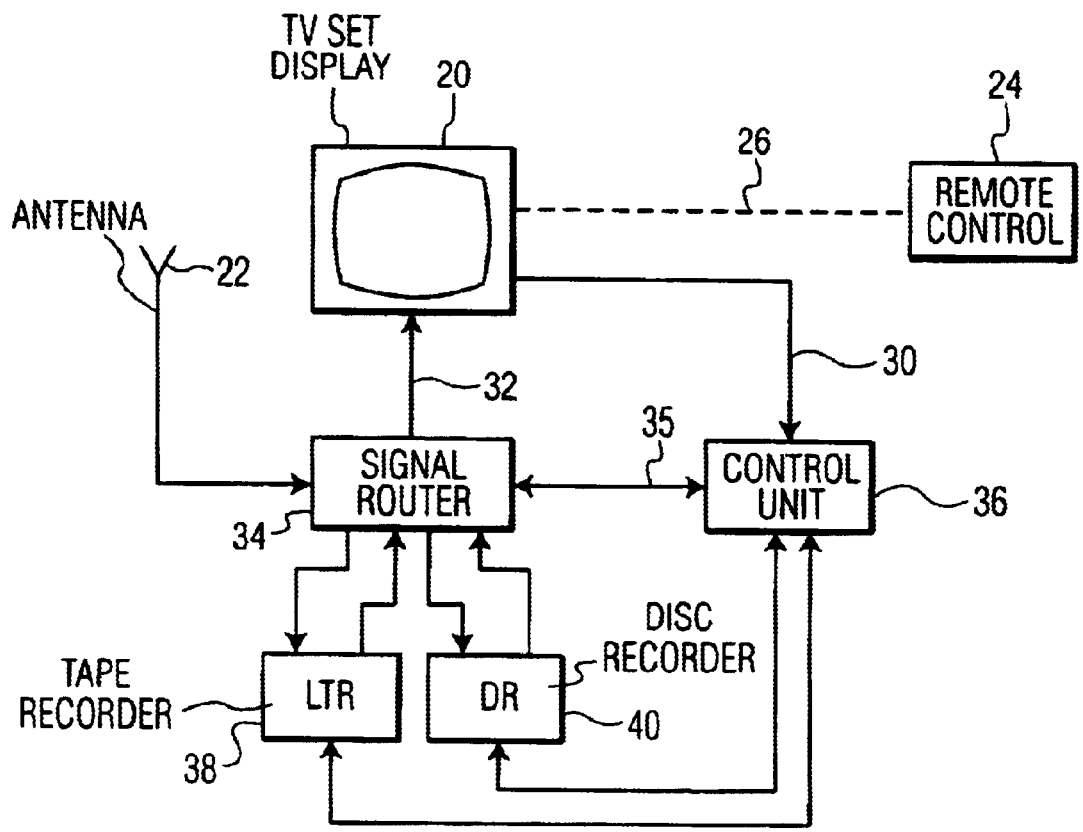
FIG. 1 is a block diagram of a TV-Recorder combination.

FIG. 1 is a diagram showing a TV-Recorder combination. Item 20 represents the TV-set display and associated immediate control and powering. Item 22 represents the antenna, or the connection with another type of signal distribution entity, such as, cable distribution. Item 22 includes, if appropriate, also the derivation of the digital video information or the digital signal part from the received signal. Item 34 represents a signal router for routing the video streams and associated information between the various subsystems of FIG. 1. The routing is governed by a control unit 36 through control signals on line 35. Line 35 has been drawn as a single bi-directional interconnection but may, in fact, be built from any number of unidirectional or bi-directional lines. Control unit 36 receives detection signals on line 30 from display 20 and from further subsystems 38, 40, while also controlling the latter two. Subsystem 38 is a linear tape recorder with a very high storage capacity, e.g., in the multi-gigabyte region. Subsystem 40 is a magnetic disc recorder with a high storage capacity, but which is nevertheless only a fraction of that of recorder 38. However, access in magnetic disc recorder 40 is much faster through cross-track jumping. Together, blocks 28 and 40 form a two-level storage organization that is somewhat akin to a computer memory cache system, and stores all items of a video presentation at least once. The TV-Recorder combination is controlled by a user by way of a remote control unit 24 which transmits wireless control signals 26 to the TV-Recorder combination.

Figure 2:
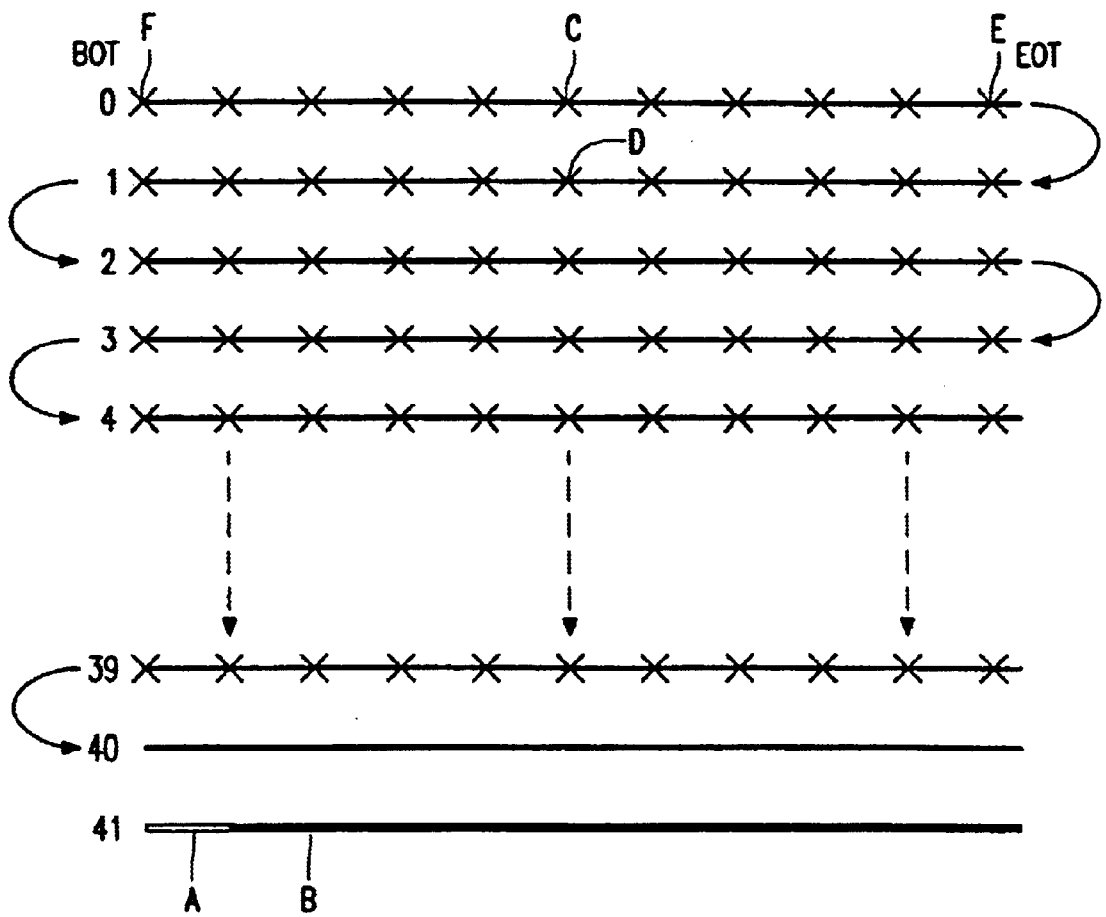
FIG. 2 shows a logical tape layout.

FIG. 2 shows the logical layout of the video tape. The physical tape is shown horizontally from left (beginning of tape) to right (end of tape). The tape in question has 42 physical tracks. Of these 42 tracks, 41 tracks are stringed to form a single logical track as indicated by the arrows. Note that storing of the video matter progresses from left to right on the even numbered tracks while the storage progresses from right to left on the odd numbered tracks. Crosses indicate the positions of the icons, or keyframes, on the various tracks, wherein the embodiment has limited the total number of keyframes to 400. The choice for assigning a keyframe has been made based on uniform physical distances between successive keyframes, which has left track 40 without keyframes storing video. In addition to the stringed physical tracks, additional track 41 has been used for storing first data for the actual keyframes in the directory part (A), and second data for the respective scenes that are associated to the various keyframes in part B. Now, the accessing of the video matter may require two kinds of displacement of the video reading head, that, in present day technology, may access much less than all tracks at a time. In particular, the present embodiment regards a head that may access only one physical track. Now, the displacement along one track may require an appreciable amount of time that may be in the region of minutes. In contradistinction, jumping across the physical tracks may occur nearly instantaneously. Therefore, jumping from actual keyframe C to actual keyframe D would require only a very short time, although effectively playing the video interval from C to D could take many minutes. In contradistinction, the time lapse, even under fast winding conditions, between keyframe C and either keyframe E or keyframe F could be quite large, even if the playtime from C to E would be only half as long as the playtime from C to D.

Figure 3:
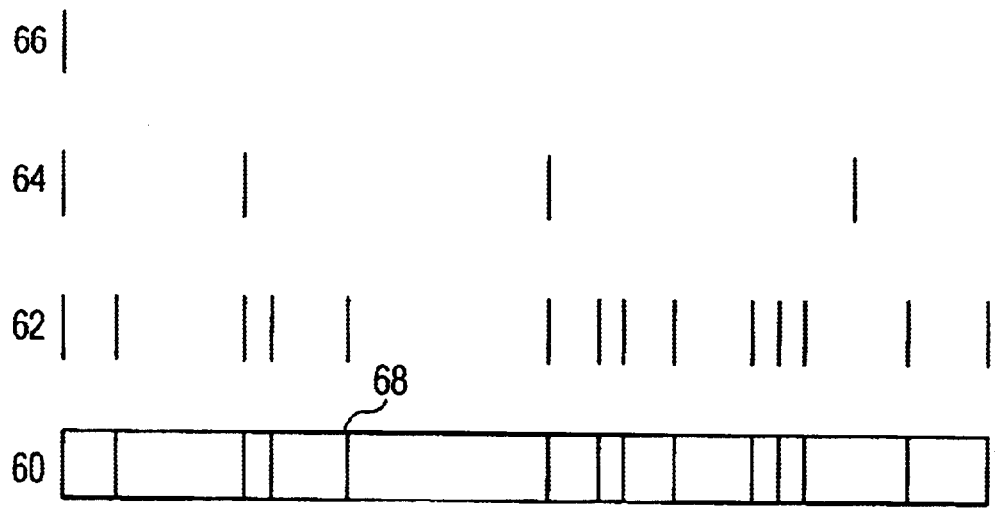
FIG. 3 shows an exemplary structure of a video recording.

FIG. 3 shows an exemplary structure of a video presentation. For effecting the video matter functionality, bar 60 contains the video itself, either in the form of frames, or as a string of compressed video matter, such as MPEG-coded. The information is stored along the bar as video time progresses, although actual storage requirements need not be uniform over time. Interspersed keyframes have been indicated by dark vertical stripes, such as 68. A keyframe is used as representing, or as being typical of, the overall video in the interval up to the next keyframe. One realization is that the video provider singles out the first frame of each new shot as the keyframe thereof through adding some label or inclusion in a "table of contents" (TOC). Another realization is that the receiver, through some algorithm, detects that the video content changes abruptly from one frame to the next. The present invention takes the associated algorithms for granted. As shown, their distribution may be non-uniform. An alternative mechanism is that successive keyframes succeed each other at prescribed intervals, such as every ten seconds. According to the embodiment, at indication 62, only the keyframes are represented. Furthermore, the keyframes are organized in some hierarchy, in that indication 64 has only a limited set of highly relevant keyframes. This hierarchy may be multilevel, in that indication 66 is associated with only a single keyframe for all of the video presentation 60. The various levels of keyframes may be determined in different ones of the organizations recited supra, and may even exist side by side. The storage mapping in FIG. 1 may be effected in that the main body of the video presentation is stored in tape recorder 38, whereas at least the keyframes are reproduced in disc recorder 40, possibly in combination with short video intervals immediately following the associated keyframe. As will be discussed hereinafter, often real-time access will remain illusory. Usually, the video presentation is essentially linear, such as a film. Alternative usage is that certain storage intervals may contain animation, stills, or other images to be used by a consumer. A possible influencing of a keyframe is to suppress it. This effectively joins the time interval before the keyframe in question with the time interval following it. A reset feature may again disjoin the interval. Also, various classes of keyframes may be suppressed, such as, the class that is separated from each other by a fixed time interval. Various different classes of keyframes could be available for one presentation, such as, those introduced by the provider versus those that are generated by a local algorithm.

FIG. 4 is an exemplary design of a scrolling mosaic user interface. Every screen presents 20 keyframes starting from the top left corner from left to right down to the bottom right corner, i.e., each keyframe has its number in the overall ranking of keyframes shown. Actually, keyframe 144 is highlighted by a rectangular control cursor. A user may, through activating a remote control, move the control cursor freely over the displayed keyframes, as well as over the buttons displayed at the top and bottom bars through the navigational controls on the cursor device. If the user moves the control cursor to the left in the top left corner, the display jumps back by 20 keyframes. Moving to the right in the lower right hand corner will cause a forward jump over 20 frames. Accessing the top bar of the overall screen will, in effect, shortcut controls for accessing other parts of the presentation, i.e., the latter is divided into five equally long parts, a black horizontal bar indicating the time of the overall presentation covered by the twenty keyframes displayed here.

Other functions may be initiated by first selecting a particular keyframe and subsequently one of the bottom buttons. "View program" may control a start at a cursor-accessed keyframe. "View segment" may do the same, but may be restricted to playing only a single segment that will end at the next keyframe. "View from x to y" may control a start at the earliest in time of two cursor-accessed keyframes, and stop at the last in time of the two cursor-accessed keyframes. Various other control modes or functions are feasible in combination with the keyframe-selecting functionalities described above. Examples are fast-forward or slow-forward, that allow a user to check a particular interval for certain occurrences, or reverse to attain certain video effects. During the display, upon passing the instant in time pertaining to a particular keyframe, the latter becomes active and effectively displays the video stream, until arriving at the instant associated with the next keyframe. Thereupon, the latter becomes the active frame.

FIGS. 5a–5e show various format embodiments of a single keyframe, enhanced according to the invention. In FIG. 5a, the stationary content of the keyframe has been symbolized by the image of a sun. The analog indication of the incurrable time lapse has been shown along the edge of the image by a frame. The indication of the delay may be shown by a color. For example, the color green signals a delay that is less than 15 seconds. The color yellow indicates a delay that lies between 15 seconds and 45 seconds. The color red signals a delay that is more than 45 seconds. Of course, other and intermediate colors may refine the signalling of the various delay values. Also, a grey-scale, or a combination thereof with a color would be feasible. In FIG. 5b, the indication may be given in similar manner but is shown here only at the left hand edge of the keyframe. This clearly would save some screen area with respect to FIG. 5a, but care must be taken that the association of the color bar to the particular keyframe must be precise. In FIG. 5c, the analog indication is shown only in a small corner block of the keyframe. This would save even more screen space than the arrangement of FIG. 5a or FIG. 5b. FIG. 5d has the analog quantity shown in a scaled manner. For example, the lower part of the bar may be green whereas the upper part of the bar is red. The indication is signalled by the actual length of the green part of the bar. As an alternative to allowing all values of the analog quantity, a restriction to a finite number thereof, such as, five or ten could be preferred. In FIG. 5e, the format of the indication closely corresponds to that of FIG. 5b, but furthermore, the analog indication is enhanced through a digital indication. For example, if the time lapse is relatively long and therefore would give rise to the red color in the format discussed with reference to FIG. 5a, the extra digital indication signals the actual delay in minutes. In the present example, the delay is 2 minutes, approximately.

What is claimed is:

1. A method for operating a video tape recorder which has multiple tracks that are physically in parallel to each other and are collectively accessible as a single logical track, said method including the steps:

selectively displaying, in parallel, a plurality of video keyframes; and controlling actual play of said video tape recorder by selectively accessing a particular displayed keyframe, characterized in that said method further comprises associating various ones of the displayed keyframes with a value-based display of an analog quantity, said analog quantity indicating an anticipated time lapse that will be necessary before actual play, as pertaining to the associated keyframe, may effectively start.

2. The method as claimed in claim 1, wherein said method comprises displaying said analog quantity as framing the associated keyframe.

3. The method as claimed in claim 1, wherein the analog quantity is a color.

4. The method as claimed in claim 1, wherein the analog quantity is enhanced through a digital indication.

5. The method as claimed in claim 1, for use with a video tape recorder having an effectively random access video buffer for diminishing said time lapse, said method adapting said analog quantity in accordance with said diminishing.

6. A video tape recorder for use with a tape having multiple tracks arranged in parallel to each other and collectively accessible as a single logical track, said recorder having display means for selectively displaying, in parallel, a plurality of video keyframes, and control means for controlling actual play upon selective detection of access to a particular displayed keyframe, characterized in that said display means comprises means for associating various ones of the displayed keyframes with a value-based display of an analog quantity, said analog quantity indicating an anticipated time lapse that will be necessary before actual play, as pertaining to the associated keyframe, may effectively start.

7. The recorder as claimed in claim 6, characterized in that said recorder further comprises an effectively random access video buffer for diminishing said time lapse, said associating means adapting said analog quantity in accordance with said diminishing.

* * * * *